United States Patent
Okuyama et al.

(10) Patent No.: US 9,764,687 B2
(45) Date of Patent: Sep. 19, 2017

(54) SOUND OUTPUT DEVICE FOR VEHICLE

(71) Applicants: PIONEER CORPORATION, Kawasaki-shi, Kanagawa (JP); TOHOKU PIONEER CORPORATION, Tendo-shi, Yamagata (JP)

(72) Inventors: Takeshi Okuyama, Tendo (JP); Yutaka Moriyama, Tendo (JP); Tomokazu Nitta, Tendo (JP)

(73) Assignees: PIONEER CORPORATION, Kanagawa (JP); TOHOKU PIONEER CORPORATION, Yamagata (JP)

( * ) Notice: Subject to any disclaimer, the term of this patent is extended or adjusted under 35 U.S.C. 154(b) by 69 days.

(21) Appl. No.: 14/781,345

(22) PCT Filed: Apr. 1, 2013

(86) PCT No.: PCT/JP2013/059975
§ 371 (c)(1),
(2) Date: Sep. 30, 2015

(87) PCT Pub. No.: WO2014/162474
PCT Pub. Date: Oct. 9, 2014

(65) Prior Publication Data
US 2016/0052449 A1 Feb. 25, 2016

(51) Int. Cl.
*B60Q 5/00* (2006.01)
*H04R 1/28* (2006.01)
(Continued)

(52) U.S. Cl.
CPC .......... *B60Q 5/008* (2013.01); *B60R 11/0217* (2013.01); *B60R 19/48* (2013.01);
(Continued)

(58) Field of Classification Search
None
See application file for complete search history.

(56) References Cited

U.S. PATENT DOCUMENTS

2009/0110224 A1* 4/2009 Tobin .................. B60Q 5/00
381/340
2013/0315418 A1* 11/2013 Nakayama ............ B60Q 5/008
381/86

FOREIGN PATENT DOCUMENTS

JP 2008-168676 A 7/2008

OTHER PUBLICATIONS

English translation of JP2010057879. Sugiyama et al, "Sound output device and sound output method." Published Nov. 17, 2011. pp. 1-10.*

(Continued)

*Primary Examiner* — Curtis Kuntz
*Assistant Examiner* — Qin Zhu
(74) *Attorney, Agent, or Firm* — Sughrue Mion, PLLC

(57) ABSTRACT

A sound path member covers a rear side of a bumper reinforcement for reinforcing a bumper of a vehicle and forms a sound path for a loudspeaker device between the sound path member and the bumper reinforcement. The sound path member is provided so that the sound path has a return portion. The loudspeaker device is arranged between the bumper reinforcement and the sound path member. Consequently, a sound radiated from a front side of the loudspeaker device is radiated through an opening of the bumper reinforcement, and a sound radiated from a rear side of the loudspeaker device passes through the sound path and is then radiated through an opening.

6 Claims, 9 Drawing Sheets

(51) Int. Cl.
*H04R 1/02* (2006.01)
*H04R 1/34* (2006.01)
*G10K 9/22* (2006.01)
*G10K 11/22* (2006.01)
*B60R 11/02* (2006.01)
*B60R 19/48* (2006.01)
*B60R 11/00* (2006.01)

(52) U.S. Cl.
CPC ................ *G10K 9/22* (2013.01); *G10K 11/22* (2013.01); *H04R 1/025* (2013.01); *H04R 1/2811* (2013.01); *H04R 1/345* (2013.01); *B60R 2011/004* (2013.01); *H04R 2499/13* (2013.01)

(56) References Cited

OTHER PUBLICATIONS

English translation of KR20110122347. Park, "Bumper of integrated speaker and method for controlling the same." Published Nov. 10, 2011. pp. 1-22.*
International Search Report of PCT/JP2013/059975, dated May 21, 2013. [PCT/ISA/210].
Written Opinion of PCT/JP2013/059975, dated May 21, 2013. [PCT/ISA/237].

* cited by examiner

SOUND OUTPUT DEVICE FOR VEHICLE

CROSS REFERENCE TO RELATED APPLICATIONS

This application is a National Stage of International Application No. PCT/JP2013/059975 filed Apr. 1, 2013, the contents of all of which are incorporated herein by reference in their entirety.

TECHNICAL FIELD

The present invention relates to a sound output device for vehicles.

BACKGROUND ART

In recent years, in vehicles in which the drive sound is quiet, such as hybrid vehicles, electric vehicles, and fuel cell powered vehicles, a technique of notifying people around the vehicle, such as pedestrians, of the approach of the vehicle has been proposed. For example, Patent Literature 1 proposes a vehicle approach notification device which emits an approach notification sound ahead of the vehicle from sound emitting means provided in a central lower portion in a vehicle width direction of a front end of a vehicle.

CITATION LIST

Patent Literature

Patent Literature 1: JP 2008-168676 A

SUMMARY OF INVENTION

Technical Problem

However, in the technique proposed in the Patent Literature 1, cost is increased because the sound emitting means is required to be additionally installed in a vehicle. In addition, due to the configuration of the sound emitting means, there is a problem that it is difficult to emit a vehicle approach notification sound (for example, an engine sound) to people present outside the vehicle at a sound pressure suitable for both vicinity and distance.

It is an object of the present invention to overcome the problems described above. Namely, an object of the present invention is to provide a sound output device for vehicles which can effectively emit a vehicle approach notification sound to people present both near and distant from a vehicle while keeping cost as low as possible.

Solution to Problem

To achieve the above object, provided is a sound output device for vehicles according to a first aspect, the sound output device radiating a sound outside the vehicle, and including: a reinforcing member for reinforcing a bumper of a vehicle; a loudspeaker device; and a sound path member covering a rear side of the reinforcing member and forms a sound path for the loudspeaker device between the sound path member and the reinforcing member wherein the sound path member is provided so that the sound path has a return portion.

DESCRIPTION OF EMBODIMENTS

Figure 1:
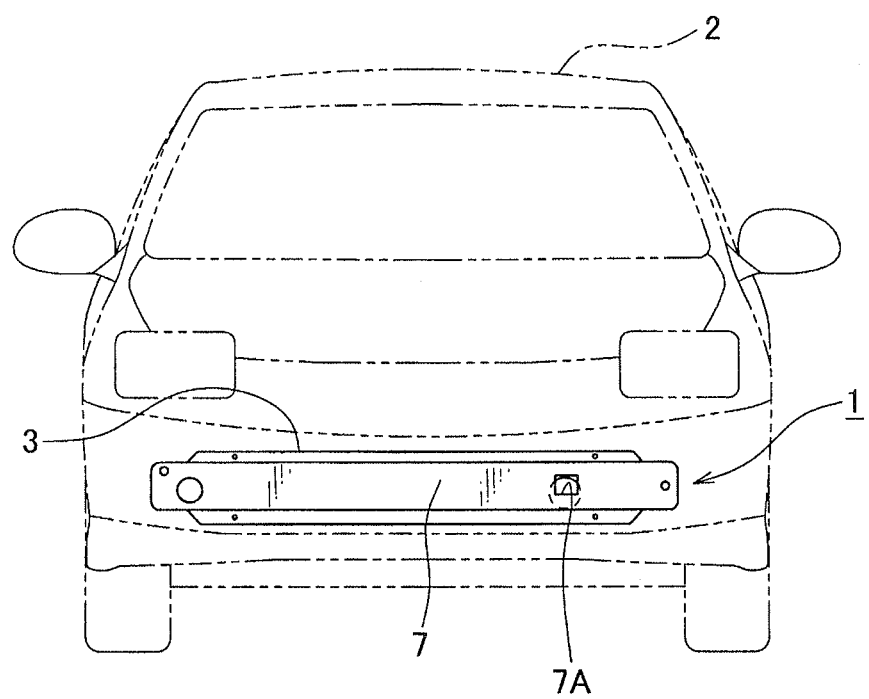
FIG. 1 is a view that illustrates a front side of a vehicle to which a sound output device for vehicles of the present invention is attached.

Hereinafter, a sound output device for vehicles according to one embodiment of the present invention will be described. A sound output device for vehicles according to one embodiment of the present invention is provided with a reinforcing member for reinforcing a bumper of a vehicle, a loudspeaker device, and a sound path member covering a rear side of the reinforcing member and forming a sound path between the sound path member and the reinforcing member, and in the sound output device for vehicles, the sound path member is provided so that the sound path has a return portion.

The sound path is provided with the return portion, and thus the sound path having a desired length can be provided without being restricted by the length of the reinforcing member, so that an approach notification sound output from the loudspeaker device can be effectively emitted to people present outside the vehicle.

The sound path may have an odd number of return portions. According to this constitution, a sound passing through the sound path can be returned to the loudspeaker device side.

A sound radiated from a front side of the loudspeaker device may be radiated through an opening of a front side of the reinforcing member.

A sound emitted from a rear side of the loudspeaker device may pass through the sound path and then be radiated through the opening. According to this constitution, the sounds radiated from the front and rear sides of the loudspeaker device can be output outside through one opening. At this time, a sound pressure of a sound with a desired frequency range output through the opening and radiated from the front and rear sides of the loudspeaker device can be increased by adjusting the length of the sound path, so that the sound can be heard the same at any listening position.

The sound path member may be attached in a driver's seat side of a rear side of the reinforcing member. According to this constitution, a sound can be radiated from the driver's seat side.

The loudspeaker device may be attached to either the reinforcing member or the sound path member.

The sound path member is provided so that the sound path has a straight portion, and cross-sectional areas of the return portion and the straight portion may be substantially equal to each other. According to this constitution, the sound radiated from the loudspeaker device can smoothly pass through the sound path.

EMBODIMENTS

First Embodiment

Hereinafter, a first embodiment of a sound output device for vehicles of the present invention will be described based on FIGS. 1 to 6. A sound output device for vehicles 1 shown in FIGS. 1 to 6 is attached to a vehicle 2, and the sound output device for vehicles 1 radiates an approach notification sound (a sound) outside the vehicle 2 to notify pedestrians or the like of the approach of the vehicle 2. In the following description, a forward moving direction of the vehicle 2 is defined as a forward direction, and a rearward moving direction of the vehicle 2 is defined as a rearward direction. Further, a forward moving direction side is defined as a front side, and a rearward moving direction side is defined as a rear side.

Figure 2A:
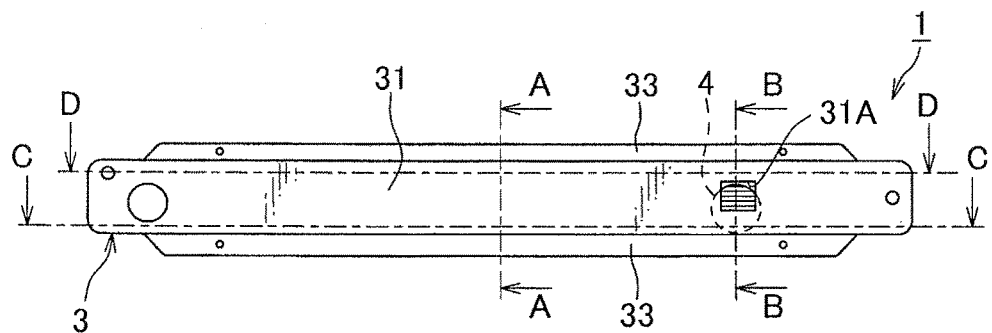
FIGS. 2A and 2B are respectively a front view and a rear view of the sound output device for vehicles shown in FIG. 1.
Figure 2B:
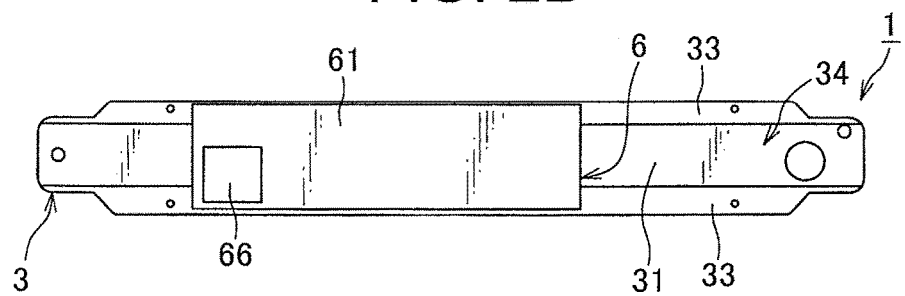

As shown in FIG. 2, the sound output device for vehicles 1 is provided with a bumper reinforcement 3 serving as a reinforcing member for reinforcing a front bumper of the vehicle 2, a loudspeaker device 4, a sound path member 6 covering a rear side of the bumper reinforcement 3 and forming a sound path 5 (FIG. 4) for the loudspeaker device 4 between the sound path member 6 and the bumper reinforcement 3, and an air seal (not shown).

Figure 3:
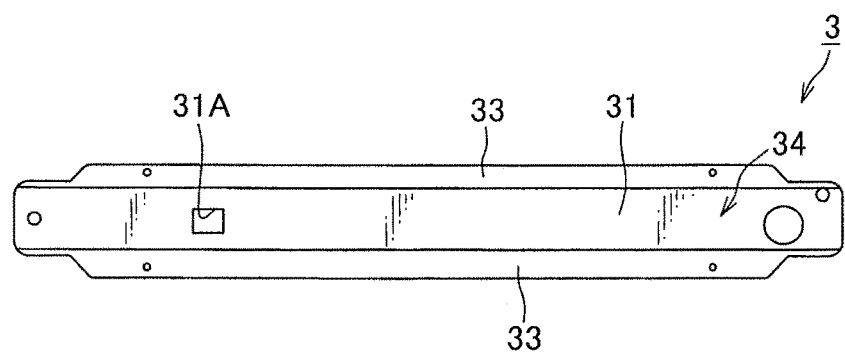
FIG. 3 is a rear view of a bumper reinforcement shown in FIG. 1.
Figure 4A:
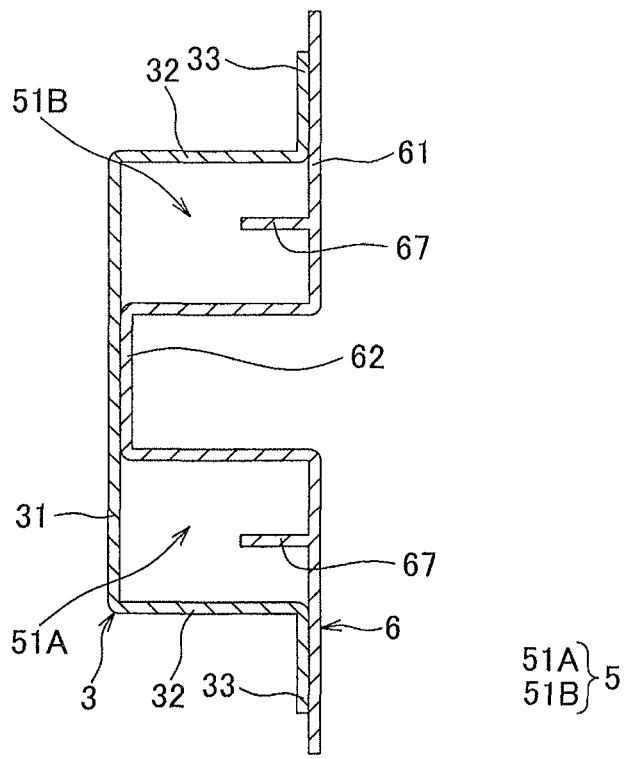
FIGS. 4A and 4B are cross-sectional views along a line A-A and a line B-B of FIG. 2A.
Figure 4B:
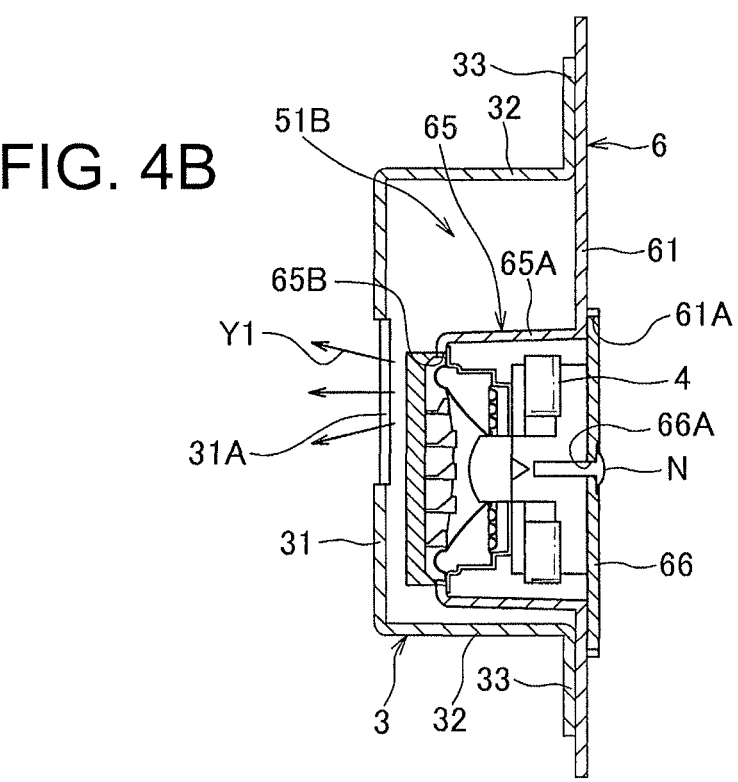

The bumper reinforcement 3 is provided by press-working a metal plate and elongated in a right and left direction of the vehicle 2. The bumper reinforcement 3 is attached to a rear side of a bumper absorber 7 (FIG. 1) serving as a shock absorbing member. As shown in FIG. 3 and FIGS. 4A, 4B, the bumper reinforcement 3 is provided with a reinforcement main body 31 elongated in the right and left direction, a reinforce side wall portion 32 provided upright in the rearward direction from both vertical ends of the reinforcement main body 31, and a reinforce flange portion 33 provided vertically upright from an end of the reinforce side wall portion 32, and a reinforcing recess 34 is formed along a longitudinal direction as viewed from the rear side.

The reinforcement main body 31 has on a passenger seat side an opening 31A through which the approach notification sound output from the loudspeaker device 4 to be described below is radiated. As shown in FIG. 1, the bumper absorber 7 to be attached in the front side of the bumper reinforcement 3 also has an opening 7A through which the approach notification sound output from the loudspeaker device 4 to be described below is radiated. The opening 7A of the bumper absorber 7 is provided facing the opening 31A of the bumper reinforcement 3.

The loudspeaker device 4 is a loudspeaker outputting the approach notification sound and generates, for example, the drive sound of the vehicle 2 as the approach notification sound in a pseudo manner. As shown in FIG. 4(B), the loudspeaker device 4 is attached to the sound path member 6 to be described later and is stored in the sound path 5 formed between the bumper reinforcement 3 and the sound path member 6. The loudspeaker device 4 is provided so that the front faces the opening 31A and the opening 7A provided respectively in the bumper reinforcement 3 and the bumper absorber 7.

Figure 6:
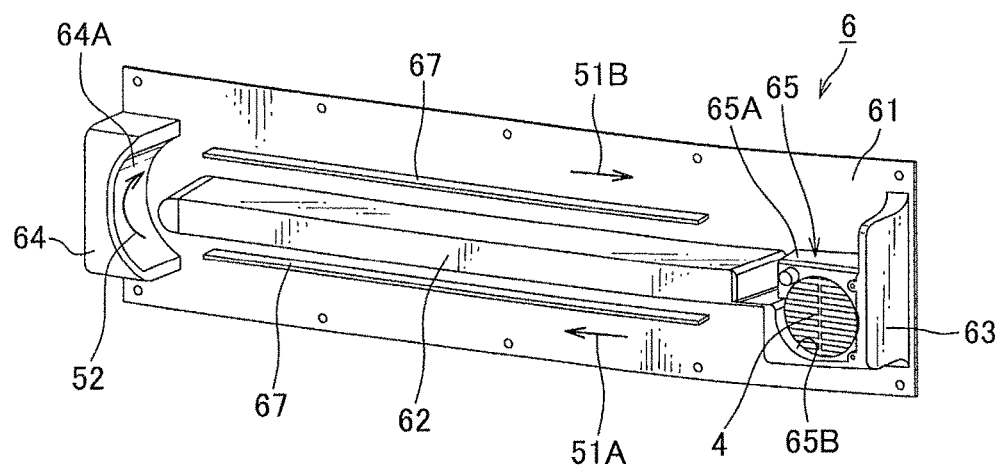
FIG. 6 is a front perspective view of a sound path member shown in FIG. 1.

The sound path member 6 is formed of resin, for example, and forms the elongated sound path 5 horizontally between the sound path member 6 and the bumper reinforcement 3. As shown in FIGS. 4A, 4B and FIG. 6, the sound path member 6 is provided with a plate-shaped sound path member main body 61 covering a rear side opening of the reinforcing recess 34, a bulkhead 62 vertically partitioning the sound path 5, a first side wall portion 63 and a second side wall portion 64 closing a longitudinal opening of the sound path 5, a storage portion 65 for storing the loudspeaker device 4, a lid portion 66, and a reinforcement rib 67.

The sound path member main body 61 is formed into an elongated plate shape. The length of the sound path member main body 61 is shorter than a longitudinal length of the bumper reinforcement 3 and is provided on the passenger seat side of the bumper reinforcement 3. The bulkhead 62 is provided upright toward the front side from the sound path member main body 61 and longitudinally extends from a vertical center of the sound path member main body 61. The bulkhead 62 vertically partitions the sound path 5 to longitudinally form first and second straight portions 51A and 51B.

The first side wall portion 63 is provided upright toward the front side from the sound path member main body 61 and extends vertically. Further, the first side wall portion 63 is provided separated on the loudspeaker device 4 side (i.e., the passenger seat side) relative to the bulkhead 62. The first side wall portion 63 is fitted into the reinforcing recess 34 to close a longitudinal opening on the passenger seat side of the sound path 5.

The second side wall portion 64 is provided upright toward the front side from the sound path member main body 61 and extends vertically. The second side wall portion 64 is fitted into the reinforcing recess 34 to close a longitudinal opening of the sound path 5 on a side away from the loudspeaker device 4 (i.e., the driver's seat side). Further, the second side wall portion 64 is provided separated on the driver's seat side of the bulkhead 62; therefore the longitudinal driver's seat side of the first straight portion 51A and the second straight portion 51B is communicated to form a return portion 52 for returning the sound path 5 from the first straight portion 51A to the second straight portion 51B. The bulkhead 62 and the second side wall portion 64 are provided so that the cross-sectional areas of the first straight portion 51A, the second straight portion 51B, and the return portion 52 are substantially equal to each other.

The second side wall portion 64 has a recess 64A recessed longitudinally on the side away from the loudspeaker device 4, and the recess 64A has R. Meanwhile, an end surface of the bulkhead 62 facing the recess 64A also has R. According to this constitution, the return portion 52 follows a curve.

As shown in FIG. 4B, the storage portion 65 is provided with a peripheral wall 65A provided upright toward the front side from a peripheral edge of an attachment hole 61A for the loudspeaker device 4 provided in the sound path member main body 61 and an opening 65B exposing a vibration plate of the loudspeaker device 4. The loudspeaker device 4 is stored in a space surrounded by the peripheral wall 65A.

Figure 5A:
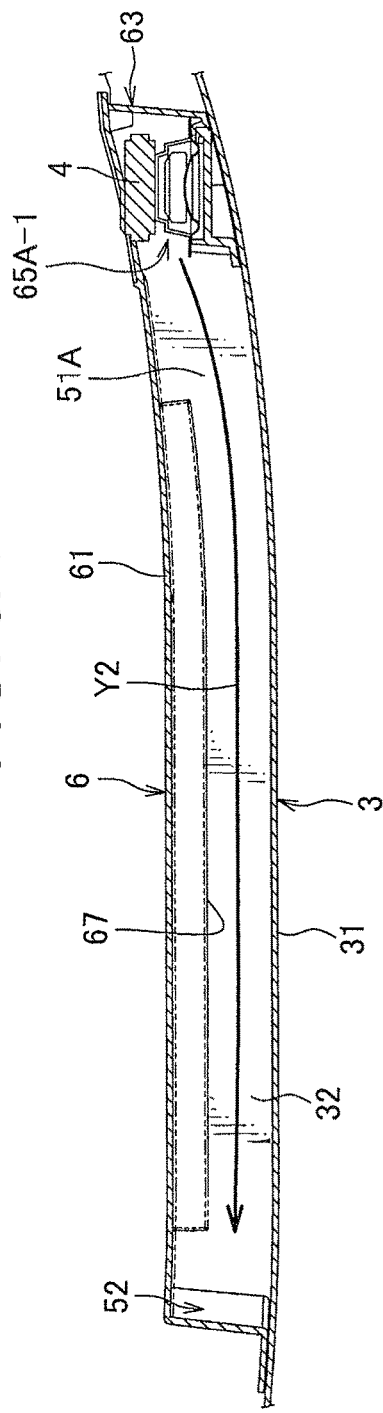
FIGS. 5A and 5B are cross-sectional views along a line C-C and a line D-D of FIG. 2A.

According to this constitution, the loudspeaker device 4 is stored in the sound path 5 as a space between the bumper reinforcement 3 and the sound path member 6. As shown in FIG. 5A, the peripheral wall 65A has an opening 65A-1 communicating with the first straight portion 51A.

The lid portion 66 is formed into a plate shape and covers, as shown in FIG. 4B, the attachment hole 61A of the sound path member main body 61 from the rear side to close the attachment hole 61A. The lid portion 66 is provided with a screw insertion hole 66A. The loudspeaker device 4 is stored in the storage portion 65 through the attachment hole 61A of the sound path member 6, and then, the lid portion 66 is arranged so as to close the attachment hole 61A. Then, a screw N is inserted into the screw insertion hole 66A of the lid portion 66 and, at the same time, screwed into a screw hole (not shown) of the loudspeaker device 4; therefore the loudspeaker device 4 can be attached to the sound path member 6.

The reinforcement rib 67 is a rib for reinforcing the sound path member 6 and, as shown in FIG. 6, the reinforcement rib 67 is provided projecting toward the front side from the sound path member main body 61 and extends along the longitudinal direction. The reinforcement ribs 67 are provided above and below the bulkhead 62.

The above-described air seal (not shown) is provided for closing a gap between the bumper reinforcement 3 and the sound path member 6 and is held between the bulkhead 62 and the bumper reinforcement 3 or between the first and second side wall portions 63 and 64 and the bumper reinforcement 3, for example.

Figure 5B:
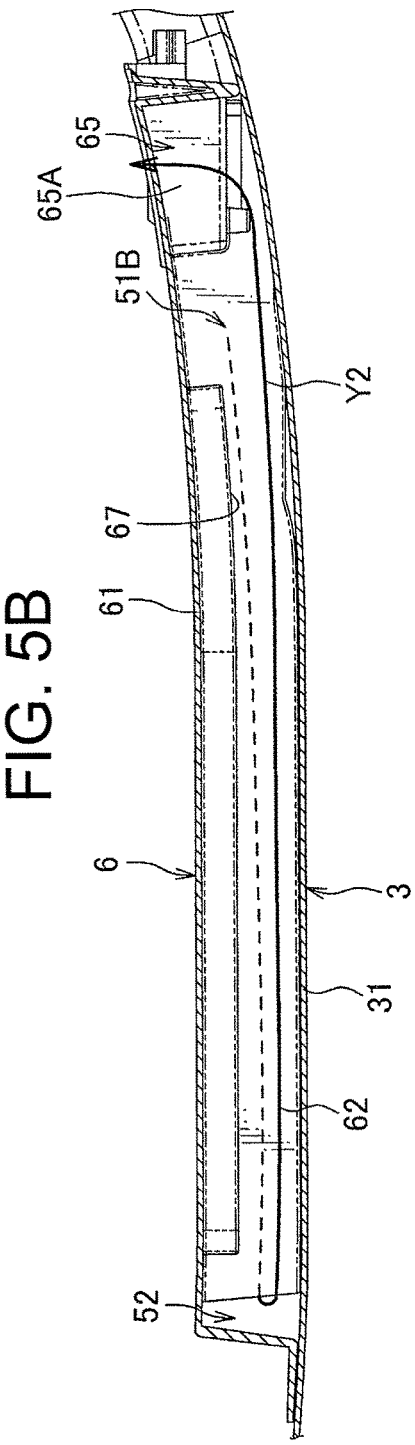

Next, radiation of a sound output from the loudspeaker device 4 constituting the sound output device for vehicles 1 configured as above will be described. As shown in FIG. 4B, a sound radiated from the front side of the loudspeaker device 4 is radiated outside the vehicle 2 through the opening 31A of the bumper reinforcement 3 and the opening 7A of the bumper absorber 7 as shown by the arrow Y1. Meanwhile, as shown in FIG. 5, a sound radiated from the rear side of the loudspeaker device 4 enters into the first straight portion 51A through the opening 65A-1 of the storage portion 65 and then moves toward the driver's seat side along the first straight portion 51A while separating from the loudspeaker device 4 as shown by the arrow Y2. After that, the sound returns along the return portion 52, enters into the second straight portion 51B, goes toward the passenger's seat side along the second straight portion 51B, and returns to the loudspeaker device 4 side. The sound having returned toward the side of the loudspeaker device 4 is radiated outside the vehicle 2 through the opening 31A of the bumper reinforcement and the opening 7A of the bumper absorber 7.

According to the above embodiment, the sound path 5 is provided with the return portion 52, and thus the sound path 5 having a desired length can be provided without being restricted by the longitudinal length of the bumper reinforcement 3, so that the approach notification sound output from the loudspeaker device 4 can be effectively emitted to people present outside the vehicle 2.

Further, according to the above embodiment, the sound path 5 has an odd number of the return portions 52 (in the above embodiment, one return portion is provided). According to this constitution, a sound passing through the sound path 5 can be returned to the loudspeaker device 4 side.

Furthermore, according to the above embodiment, the sound radiated from the front side of the loudspeaker device 4 is radiated through the opening 31A of the front side of the bumper reinforcement 3, and the sound radiated from the rear side of the loudspeaker device 4 passes through the sound path 5 and is then radiated through the opening 31A of the front side of the bumper reinforcement 3. According to this constitution, the sounds radiated from the front and rear sides of the loudspeaker device 4 can be output outside through one opening 31a. At this time, a sound pressure of a sound with a desired frequency range output through the opening 31A and radiated from the front and rear sides of the loudspeaker device 4 can be increased by adjusting the length of the sound path 5, so that the sound can be heard the same at any listening position.

Figure 7:
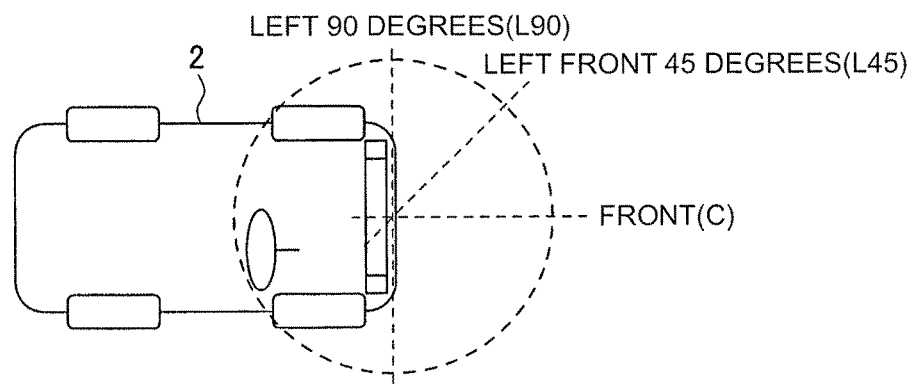
FIG. 7 is a view that illustrates a relationship between a vehicle and a listening position.
Figure 8A:
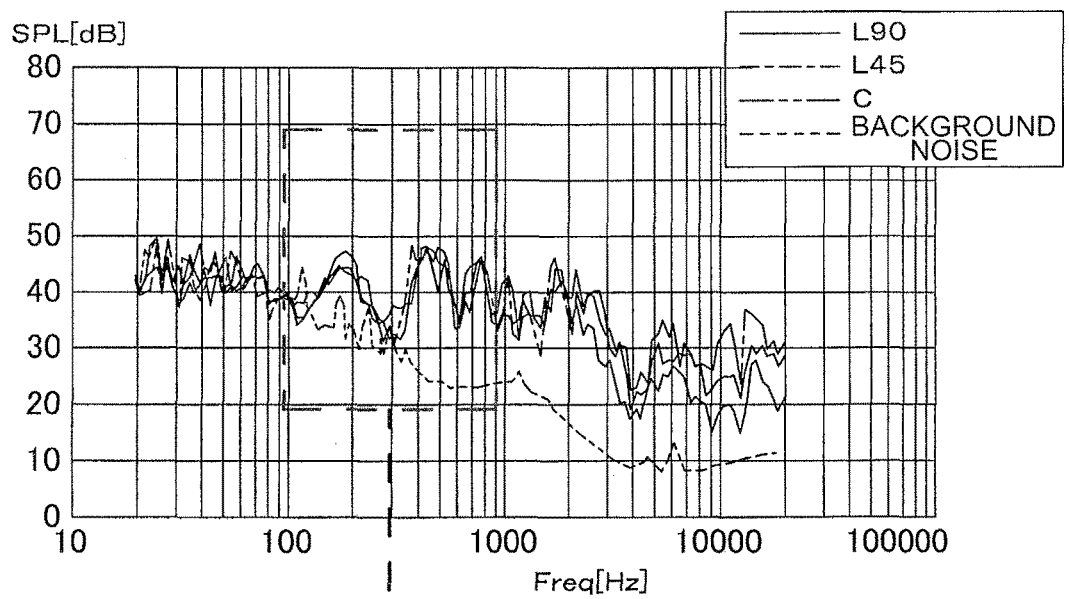
FIG. 8A is a graph that illustrates frequency characteristics of a sound pressure of a loudspeaker device at each listening position shown in FIG. 7.
Figure 8B:
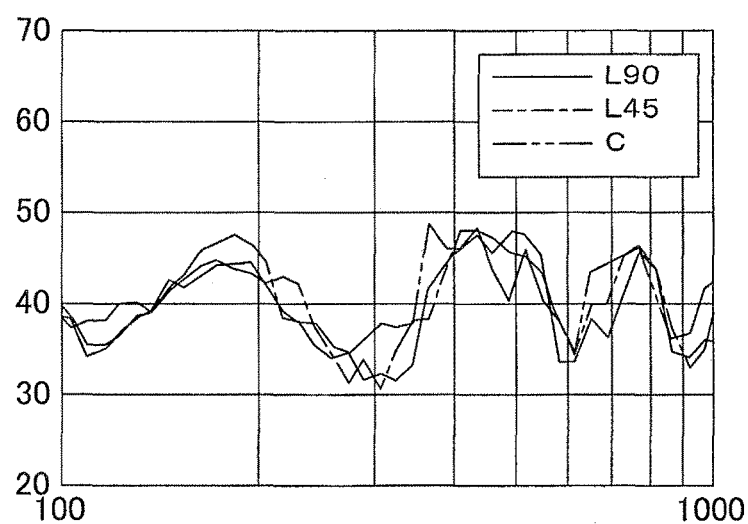
FIG. 8B is a partially enlarged graph of FIG. 8A.

Next, the present inventors manufactured the above-described sound output device for vehicles 1, and as shown in FIG. 7, frequency characteristics of sound pressures of the loudspeaker device 4 on the front side, at left front 45 degrees, and at left 90 degrees with respect to the vehicle 2 and background noise were measured. The results are shown in FIGS. 8A and 8B. As seen in FIGS. 8A and 8B, substantially the same frequency characteristics can be obtained even if a listening position changes, and it could be confirmed that the sound can be heard the same at any listening position.

Further, according to the above embodiment, the cross-sectional areas of the first straight portion 51A, the second straight portion 51B, and the return portion 52 of the sound path 5 are substantially equal to each other. According to this constitution, the sound radiated from the loudspeaker device 4 can smoothly pass through the sound path 5.

Further, according to the above embodiment, the recess 64A of the second side wall portion 64 and the end surface of the bulkhead 62 facing the recess 64A have R. According to this constitution, the return portion 52 is provided along a curve, and a sound radiated from the loudspeaker device 4 is smoothly returned by the return portion 52.

In the above-described first embodiment, although the sound radiated from the rear side of the loudspeaker device 4 passes through the sound path 5 in order of the first straight portion 51A provided on the downside, the return portion 52, and the second straight portion 51B, the present invention is not limited thereto. The sound may pass through the sound path in order of the second straight portion 51B provided topside, the return portion 52, and the first straight portion 51A.

Further, in the above-described first embodiment, although the sound path member 6 is attached in the passenger seat side of the bumper reinforcement 3, the present invention is not limited thereto. The sound path member 6 may be attached in the side of the driver's seat. Although a driver's seat is on the right or left side depending on the country, the embodiment of the present application is not limited to the right or left side.

Furthermore, in the above-described first embodiment, although the loudspeaker device 4 is attached to the sound path member 6, the present invention is not limited thereto. The loudspeaker device 4 may be attached to the bumper reinforcement 3.

Second Embodiment

Figure 9A:
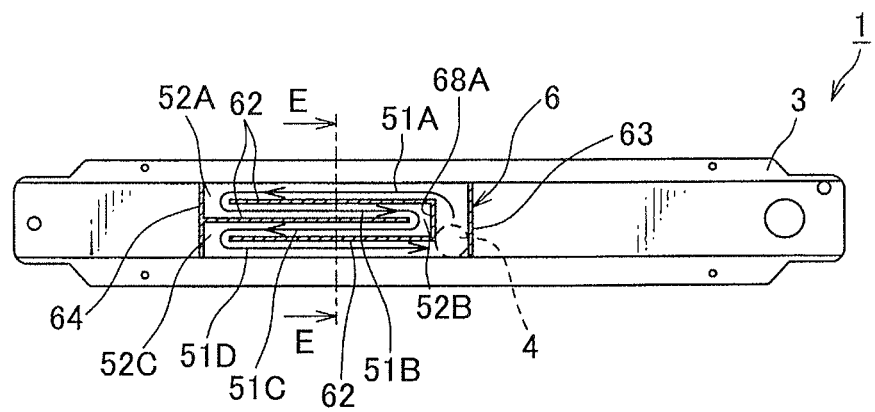
FIG. 9A is a rear view of a sound output device for vehicles in a second embodiment.
Figure 9B:
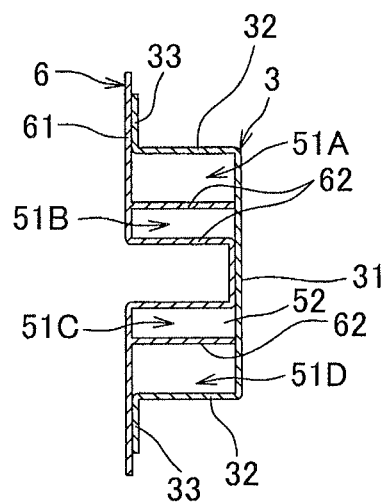
FIG. 9B is a cross-sectional view along a line E-E of FIG. 9A.

Next, a second embodiment will be described with reference to FIGS. 9A and 9B. FIG. 9A shows a cross section of the sound path member 6. The second embodiment is different from the first embodiment in the shape of the sound path 5. Although in the first embodiment the return portion 52 is provided at only one point, in the second embodiment first to third return portions 52A to 52C are provided at three points.

Specifically, although in the first embodiment one bulkhead 62 is provided, in the second embodiment three bulkheads 62 are provided, and a sound path 5 is vertically partitioned into four portions. According to this constitution, the sound path 5 is longitudinally partitioned into four, first to fourth, linear straight portions 51A to 51D. Further, as shown in FIG. 9A, the central bulkhead 62 is provided so as to connect to a second side wall portion 64. Further, a third side wall portion 68A connecting with ends on the side of loudspeaker device 4 of the uppermost bulkhead 62 and lowermost bulkhead 62 is provided. The central bulkhead 62 is spaced apart from the third side wall portion 68A.

According to the above constitution, the first return portion 52A communicates ends on a side away from the loudspeaker device 4 of the first straight portion 51A and the second straight portion 51B. The second return portion 52B communicates ends on the loudspeaker device 4 side of the second straight portion 51B and the third straight portion 51C, and the third return portion 52C communicates on the side away from the loudspeaker device 4 of the third straight portion 51C and the fourth straight portion 51D.

According to the above constitution, a sound radiated from a rear side of the loudspeaker device 4 passes through the sound path 5 in order of the first straight portion 51A, the first return portion 52A, the second straight portion 51B, the second return portion 52B, the third straight portion 51C, and the fourth straight portion 51D as shown by the arrow and is then radiated outside the vehicle 2 through an opening 31A of a bumper reinforcement 3 and an opening 7A of a bumper absorber 7. Thus, the sound path 5 can be further elongated. Further, weight saving and cost reduction can be achieved by reducing the length of the sound path member 6.

Third Embodiment

Figure 10A:
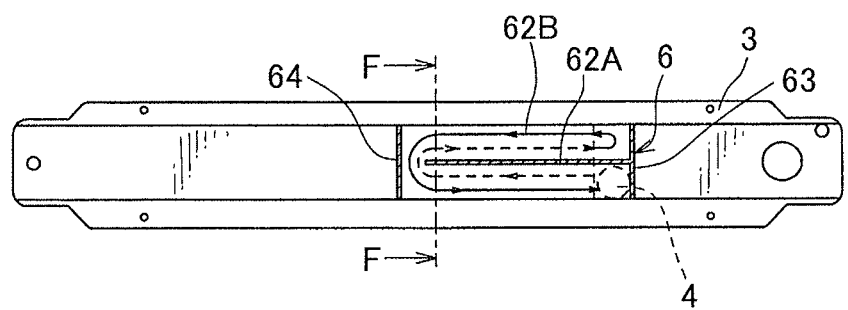
FIG. 10A is a rear view of a sound output device for vehicles in a third embodiment.

Next, a third embodiment will be described with reference to FIG. 10. The third embodiment is different from the first embodiment in the shape of the sound path 5. Although in the first embodiment the return portion 52 is provided at only one point, in the third embodiment first to third return portions 52A to 52C are provided at three points. Further, although in the first embodiment the sound path 5 is vertically partitioned into two straight portions, in the third embodiment the sound path 5 is partitioned vertically and forward and rearward into four, first to fourth, straight portions 51A to 51D.

Specifically, in the third embodiment, a sound path member 6 is provided upright on the rear side from a sound path member main body 61 and is provided with a first bulkhead 62A partitioning the sound path 5 vertically and a second bulkhead 62B provided parallel to the sound path member main body 61 and partitioning the sound path 5 forward and rearward. The second bulkhead 62B is provide upright toward the loudspeaker device 4 side from a second side wall portion 64 and crosses the first bulkhead 62A. A first side wall portion 63 is provided spaced apart from the second bulkhead 62B.

Figure 10B:
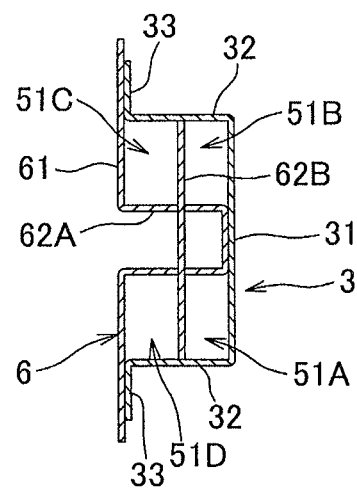
FIG. 10B is a cross-sectional view along a line F-F of FIG. 10A.
Figure 10C:
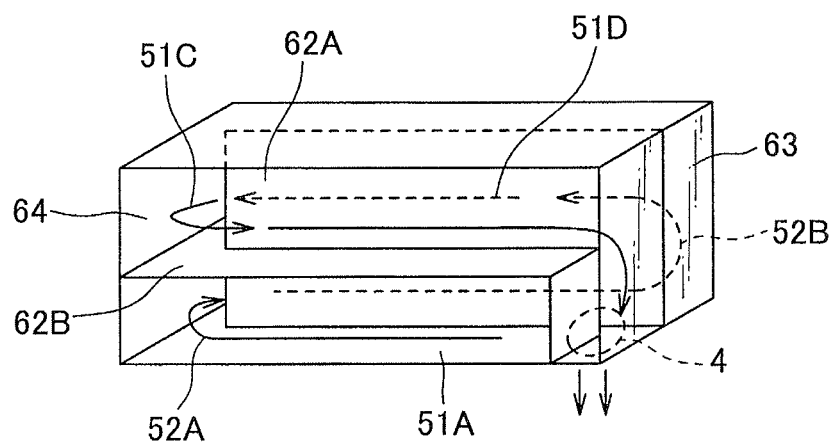
FIG. 10C is a schematic perspective view of a sound path formed by a bumper reinforcement and a sound path member shown in FIG. 10A.

According to the above constitution, as shown in FIG. 10C, the first return portion 52A connects ends on a side away from the loudspeaker device 4 of the first straight portion 51A and the second straight portion 51B, the second return portion 52B connects ends on the loudspeaker device 4 side of the second straight portion 51B and the third straight portion 51C, and the third return portion 52C communicates ends on the side away from the loudspeaker device 4 of the third straight portion 51C and the fourth straight portion 51D.

According to the above constitution, a sound radiated from a rear side of the loudspeaker device 4 passes through the sound path 5 in order of the first straight portion 51A provided on the front side and downside, the first return portion 52A, the second straight portion 51B provided on the front side and topside, the second return portion 52B, the third straight portion 51C provided on the rear side and topside, the third return portion 52C, and the fourth straight portion 51D provided on the rear side and downside as shown by the arrow of FIG. 10B or FIG. 10C and is then radiated outside the vehicle 2 through an opening 31A of a bumper reinforcement 3 and an opening 7A of a bumper absorber 7.

Forth Embodiment

Figure 11A:
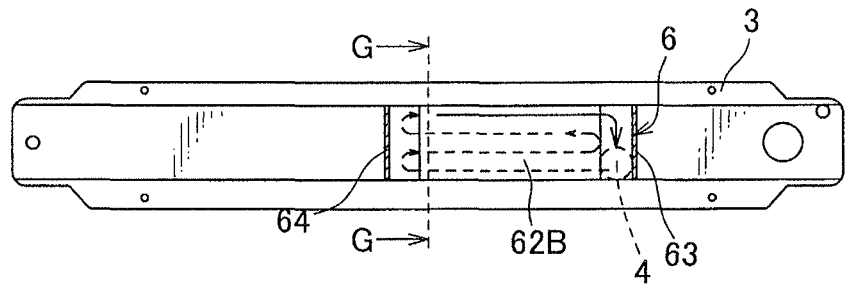
FIG. 11A is a rear view of a sound output device for vehicles in a fourth embodiment.
Figure 11B:
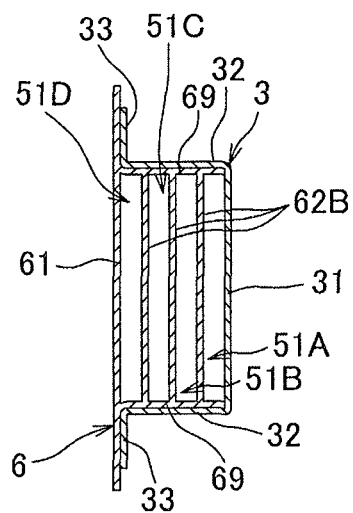
FIG. 11B is a cross-sectional view along a line G-G of FIG. 11A.
Figure 11C:
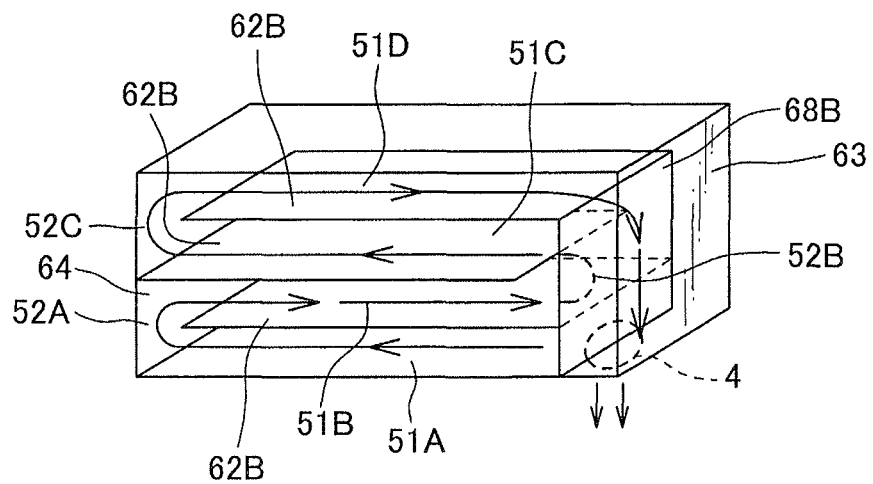
FIG. 11C is a schematic perspective view of a sound path formed by a bumper reinforcement and a sound path member shown in FIG. 11A.

Next, a fourth embodiment will be described with reference to FIGS. 11A to 11C. The fourth embodiment is different from the first embodiment in the shape of the sound path 5. Although in the first embodiment the sound path 5 is vertically partitioned into two straight portions, in the fourth embodiment the sound path 5 is partitioned forward and rearward into four, first to fourth, straight portions 51A to 51D. Specifically, in the fourth embodiment, as shown in FIG. 11B, three second bulkheads 62B arranged parallel to a sound path member main body 61 are provided. The second bulkhead 62B is supported by a pair of vertical walls 69 provided upright toward the front side from the sound path member main body 61.

The second bulkhead 62B at the center in the front-rear direction is provided upright toward a loudspeaker device 4 from a second side wall portion 64. The front and rear second bulkheads 62B are provided so that the both longitudinal ends are spaced apart from the first and second side wall portions 63 and 64. Further, a fourth side wall portion 68B connecting ends on the loudspeaker device 4 side of the front and rear second bulkheads 62B is provided. The central second bulkhead 62B is provided spaced apart from the fourth side wall portion 68B.

According to the above constitution, the first return portion 52A communicates ends on a side away from the loudspeaker device 4 of the first straight portion 51A and the second straight portion 51B, the second return portion 52B communicates ends on the loudspeaker device 4 side of the second straight portion 51B and the third straight portion 51C, and the third return portion 52C communicates on the side away from the loudspeaker device 4 of the third straight portion 51C and the fourth straight portion 51D.

Also in the above case, a sound radiated from a rear side of the loudspeaker device 4 passes through the sound path 5 in order of the first straight portion 51A, the first return portion 52A, the second straight portion 51B, the second return portion 52B, the third straight portion 51C, the third return portion 52C, and the fourth straight portion 51D as shown by the arrow of FIG. 10B or FIG. 10C and is then radiated outside the vehicle 2 through an opening 31A of a bumper reinforcement 3 and an opening 7A of a bumper absorber 7.

In the above-described embodiments, an odd number of the return portions 52 are provided, and the sounds output from the front and rear sides of the loudspeaker device 4 are radiated through one opening 31A provided in the front side of the bumper reinforcement 3; however, the present invention is not limited thereto. An even number of the return portions 52 may be provided, and the sounds output from the front and rear sides of the loudspeaker device 4 may be radiated through different openings.

Further, in the above-described embodiments, although the sound output from the loudspeaker device 4 is radiated through the opening 31A provided in the front side of the bumper reinforcement 3, the present invention is not limited thereto. The sound may be radiated through a longitudinal opening of the sound path 5.

Furthermore, in the above-described embodiments, the bumper reinforcement 3 is used for reinforcing a front bumper and may be used for reinforcing a rear bumper.

It should be noted that since the above embodiments have anything more than shown a typical configuration of the present invention, the present invention is not limited in these embodiments. Namely, various configurations are allowed to implement without departing from the scope of the invention.

REFERENCE SIGNS LIST 1 sound output device for vehicles
2 vehicle
3 bumper reinforcement (reinforcing member)
4 loudspeaker device
5 sound path
6 sound path member
51A first straight portion (straight portion)
51B second straight portion (straight portion)
51C third straight portion (straight portion)
51D fourth straight portion (straight portion)
52 return portion
52A return portion
52B return portion
52C return portion
31A opening

The invention claimed is:

1. A sound output device for a vehicle, comprising:
a reinforcing member for reinforcing a bumper of the vehicle and having an opening at a front side of the reinforcing member;
a sound path member for forming a sound path to the reinforcing member; and
a loud speaker device stored in the sound path,
wherein the sound path member is provided so that the sound path has a return portion, and
wherein sound radiated from a front side of the loudspeaker device is radiated through the opening of the front side of the reinforcing member, and sound radiated from a rear side of the loudspeaker device passes through the sound path and is radiated through the opening.

2. The sound output device according to claim 1, wherein the sound path has an odd number of the return portions.

3. The sound output device according to claim 1, wherein the sound path member is attached in a driver's seat side of a rear side of the reinforcing member.

4. The sound output device according to claim 1, wherein the loudspeaker device is attached to the reinforcing member.

5. The sound output device according to claim 1, wherein the loudspeaker device is attached to the sound path member.

6. The sound output device according to claim 1, wherein the sound path member is provided so that the sound path has a straight portion, and the cross-sectional areas of the return portion and the straight portion are equal to each other.

* * * * *